United States Patent
Vempati et al.

(10) Patent No.: US 10,027,657 B1
(45) Date of Patent: Jul. 17, 2018

(54) AUTHENTICATION/AUTHORIZATION WITHOUT A PASSWORD

(71) Applicant: Wells Fargo Bank, N.A., San Francisco, CA (US)

(72) Inventors: Madhu V. Vempati, Hyderabad (IN); Rameshchandra B. Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 219 days.

(21) Appl. No.: 15/203,480

(22) Filed: Jul. 6, 2016

(51) Int. Cl.
G06F 21/00 (2013.01)
H04L 29/06 (2006.01)
G06F 21/62 (2013.01)

(52) U.S. Cl.
CPC ........ *H04L 63/083* (2013.01); *G06F 21/6245* (2013.01)

(58) Field of Classification Search
CPC ..................................................... H04L 63/083
USPC ........................................................ 726/28
See application file for complete search history.

(56) References Cited

U.S. PATENT DOCUMENTS

| | | | |
|---|---|---|---|
| 8,155,402 B2 | 4/2012 | Kiyomizu et al. | |
| 8,881,251 B1 | 11/2014 | Hilger | |
| 8,892,461 B2 | 11/2014 | Lau et al. | |
| 8,982,070 B2 * | 3/2015 | Tomimori | G06F 3/0483 345/1.1 |
| 9,192,861 B2 | 11/2015 | Gross | |
| 2013/0326600 A1 | 12/2013 | Sorek | |
| 2014/0354596 A1 | 12/2014 | Djordjev et al. | |
| 2015/0067786 A1 | 3/2015 | Fiske | |
| 2015/0074615 A1 * | 3/2015 | Han | G06K 9/00033 715/863 |
| 2015/0269376 A1 | 9/2015 | Keohane et al. | |
| 2015/0349957 A1 | 12/2015 | Thibadeau, Sr. et al. | |

OTHER PUBLICATIONS

Sinofsky, Steven, "Signing in with a picture password," https://blogs.msdn.microsoft.com/b8/2011/12/16/signing-in-with-a-picture-password/, Dec. 16, 2011, 26 pages.
Jansen, Wayne, "Authenticating Mobile Device Users Through Image Selection," The National Institute of Standards and Technology, 2004, 10 pages.

* cited by examiner

*Primary Examiner* — Longbit Chai
(74) *Attorney, Agent, or Firm* — Merchant & Gould P.C.

(57) ABSTRACT

A method for authenticating a user on the electronic computing device includes receiving a request to authenticate the user. First data is received from the electronic computing device. The first data comprises selections of the user of a plurality of locations from a picture displayed on the electronic computing device. The first data also comprises force data representing forces applied by the user when making the selections. The first data is compared with second data. A determination is made as to whether aspects of the first data correspond to aspects of the second data. When the aspects of the first data correspond to the aspects of the second data, the user is authenticated.

20 Claims, 9 Drawing Sheets

AUTHENTICATION/AUTHORIZATION WITHOUT A PASSWORD

BACKGROUND

When a user accesses an electronic computing device, such as a server computer, and the electronic computing includes sensitive or personal information, the user typically needs to be authenticated before gaining access to the electronic computing device. Authentication comprises verifying an identity of the user and, based on the identity of the user, determining whether the user is permitted to access the electronic computing device.

A common method of user authentication is for the user to enter a user identifier (user ID) and a password. However, entering a user ID and a password on an electronic computing device can be cumbersome and prone to typographical and other errors. Further, such user identifiers and passwords can be compromised if not safeguarded properly.

SUMMARY

Embodiments of the disclosure are directed to a method implemented on an electronic computing device for authenticating a user on the electronic computing device, the method comprising: receiving a request to authenticate the user; receiving first data from the electronic computing device, the first data comprising first selections of the user of a plurality of locations from a picture displayed on the electronic computing device, the first data also comprising first force data representing first forces applied by the user when making the first selections; comparing the first data with second data; determining whether first aspects of the first data correspond to second aspects of the second data; and when the first aspects of the first data correspond to the second aspects of the second data, authenticating the user.

In another aspect, a method implemented on an electronic computing device for authenticating a user on the electronic computing device comprises: displaying a picture that can be used to authenticate the user; receiving first data for a first connection between a plurality of locations on the picture, the first connection including a first line drawn between the plurality of locations on the picture; receiving a request to authenticate the user; receiving second data for a second connection between the plurality of locations on the picture, the second connection including a second line drawn between the plurality of locations on the picture; comparing the first data with the second data; determining whether first aspects of the first data match second aspects of the second data; and when the first aspects of the first data match the second aspects of the second data, authenticating the user for access to the electronic computing device.

In yet another aspect, an electronic computing device includes a processing unit; and system memory, the system memory including instructions which, when executed by the processing unit, cause the electronic computing device to: render a picture on a display screen of the electronic computing device; receive first data from a first connection made by a user between two locations on the picture, the first connection comprising a first line drawn by the user connecting a first of the two locations with a second of the two locations, the first data comprising part of an authentication procedure for the user on the electronic computing device; receive a request to authenticate the user; receive second data from a second connection made by the user between the two locations on the picture, the second connection comprising a second line drawn by the user connecting the first of the two locations with the second of the two locations; determine whether a first connection point from the first data is within a first threshold percentage from a second connection point from the second data and determine whether a third connection point from the first data is within the first threshold percentage from a fourth connection point from the second data, wherein the first connection point corresponds to a first starting point for the first connection, the second connection point corresponds to a second starting point for the second connection, the third connection point corresponds to a first ending point for the first connection and the fourth connection point corresponds to a second ending point for the second connection; and when a determination is made that the first connection point from the first data is within the first threshold percentage from the second connection point from the second data and when a determination is made that the third connection point from the first data is within the first threshold percentage from the fourth connection point from the second data: determine whether a first maximum depth of first depressions made on the display screen of the electronic computing device for the first line is within a second threshold percentage of a second maximum depth of second depressions made on the display screen for the second line; determine whether a first width of the first line is within a third threshold percentage of a second width of the second line; and when the first maximum depth of the first depressions for the first line is within the second threshold percentage of the second maximum depth of the second depressions for the second line and when the first width of the first line is within the second width of the second line, authenticate the user to log in to the electronic computing device.

The details of one or more techniques are set forth in the accompanying drawings and the description below. Other features, objects, and advantages of these techniques will be apparent from the description, drawings, and claims.

DETAILED DESCRIPTION

Figure 1:
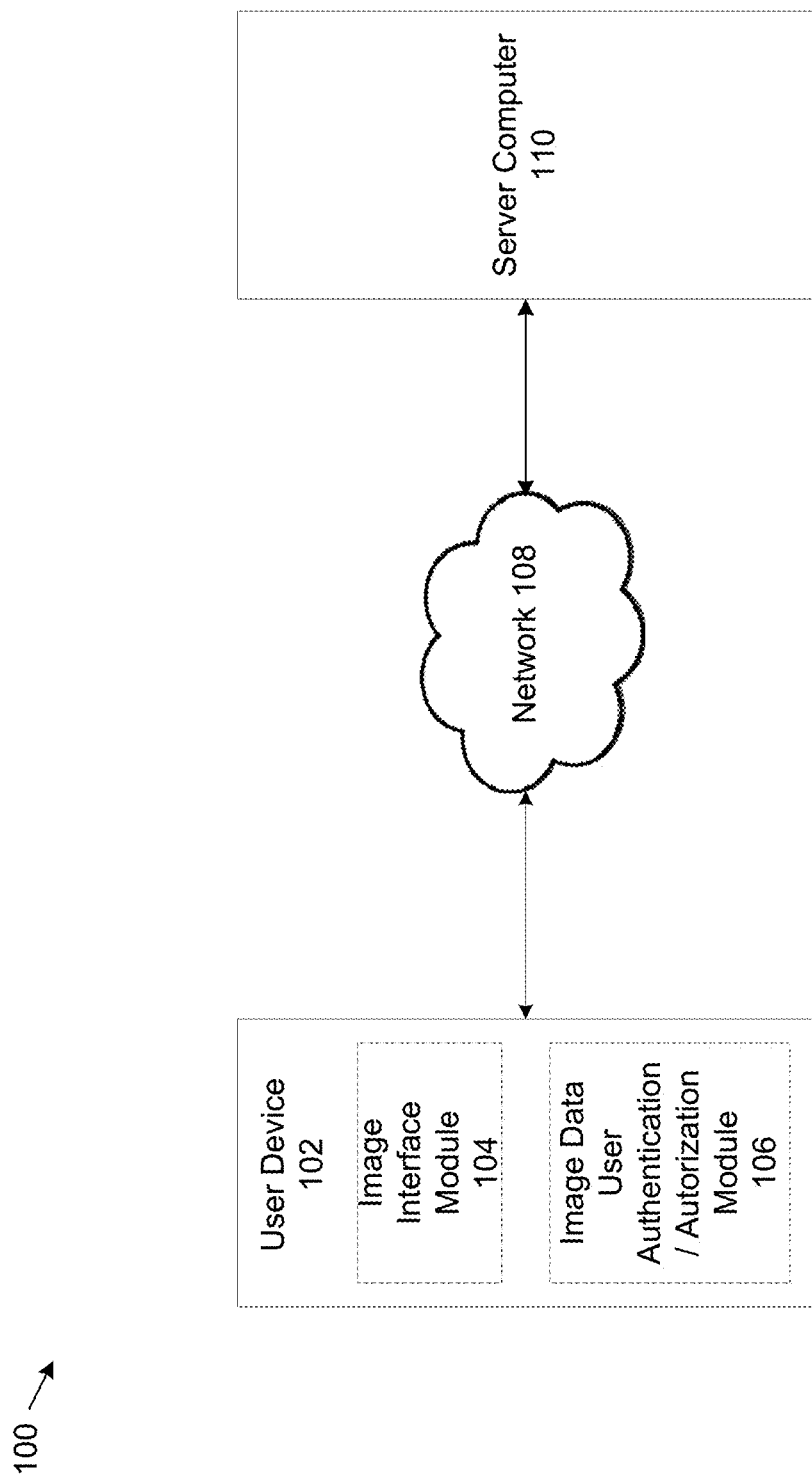
FIG. 1 shows an example system that supports authentication and authorization without a password.

The present disclosure is directed to systems and methods that facilitate authentication at an electronic computing device without needing to enter a user ID and password. Instead, a picture can be presented to a user at a user device and the user can be authenticated using the picture. As used in this disclosure, a picture comprises a painting, a drawing or photograph of someone or something.

In one implementation, during a setup procedure the user can be asked to select one or more pixel points on the picture. Each pixel point corresponds to a small area of pixels on the picture. The user can be presented with the picture again and asked to locate on the picture the one or more pixel points previously selected. When the user correctly selects all previously selected pixel points on the picture, a determination can be made that the user is authenticated to log into the electronic computing device. Once the user the user is authenticated, the user can be authorized to access information on the electronic computing device.

As discussed in more detail later herein, each pixel point on the picture comprises an area of multiple pixels (i.e., two or more) that is clustered about the pixel point. In this disclosure, the term pixel point is simply referred to as a "point". As used in this disclosure, authentication of a user comprises verifying an identity of the user. As used in this disclosure, authorization of a user comprises validating a user for a specific level of access when logged in to the electronic computing device.

In another implementation for a user device that includes three-dimensional (3D) touch capability, when the user selects the one or more areas on the picture, a depth of a depression on a display screen of the user device can be obtained. The depression can be made using one of the user's fingers or the depression can be made by a physical object, such as a stylus or a pencil. When the user is presented with the picture during a login to the electronic computing device, and the user selects the one or more points, the depth of the depression the user makes on the display screen can be compared with the depth of a previously obtained depression. When the comparisons of the depth of the depressions are within a predetermined limit, the systems and methods can determine to authenticate the user. The comparison of the depth of the depressions can be used in conjunction with a location of the one or more points of the picture, as previously described.

In yet another implementation using a 3D touch user device, as a pre-authorization step the user can be asked to make a connection on the user device between two points selected on the picture. The connection can comprise a line between the two points. The line can be of various lengths and shapes. For example, the line can be a straight line between the two points, a curved line between the two points or any combination of straight and curved lines. When the user attempts to login using the electronic computing device, the user attempts to locate the two points and recreate the connection between the two points. When a determination is made that the connection made during the login attempt is within a predetermined threshold of the connection the user made during the pre-authorization step, the user can be permitted to login to the electronic computing device.

In one implementation of the systems and methods, data from the selected one or more points on the picture, from the depressions made and from the connections between the two points can be used to determine whether the user can be authenticated for login. For example, the electronic computing device can determine whether locations for the selected points on the picture correspond to preselected points on the picture, whether depths of the depressions correspond to preselected depths of the depressions and whether the two points in the connection and the shape of the connection corresponds to preselected points and shape of the connection. When a comparison of one or more of the selected locations, depths of the depressions and shape of the connection are within predetermined limits, the user can be authenticated for login to the electronic computing device.

Other aspects from the picture can also be used to help determine whether the user can be authenticated for login to the electronic computing device. The other aspects can include a rate at which a connection is made, as indicated by a speed of a finger or physical object on the user device when making the connection, and an angle of a finger or physical object that is used to make the connection. The other aspects can also include a pulse rate for the user (as determined by sensing the user's pulse), a temperature signature of the user (as obtained by sensing a temperature of the user's finger) and a determination of the user's DNA. Additional aspects are possible.

In yet another implementation using the systems and methods, the user can sign a transaction slip on an electronic signature pad of a POS (point of sale) device or application on a smartphone. The user's signature can be compared with a signature of the user on file to authenticate the user when making a purchase. As another example of this implementation, the user can provide a signature on a digital check or an electronic document and the signature can be compared with the signature of the user on file to authenticate the user.

FIG. 1 shows an example system 100 that supports authentication and authorization without a password. The example system 100 includes a user device 102, a network 108 and a server computer 110. The user device includes an image interface module 104 and an image data user authentication/authorization module 106. More, fewer or different modules can be used.

The example user device 102 is a mobile electronic computing device such as a smartphone or a tablet computer. In some implementations, the user device 102 can also be a desktop or laptop computer. The user device 102 includes a software application that can display a picture to the user and can process data received from user operations on the picture. The data received can be used to authenticate and authorize the user for a login to user device 102 or for accessing one or more applications and/or data on the user device 102. In some implementations, the picture that is displayed is obtained from storage on the user device 102. In other implementations the picture can be obtained from server computer 110 or obtained from a repository accessible from server computer 110 and downloaded across network 108 to user device 102.

The example image interface module 104 can display an image of a picture on user device 102. The image interface module 104 can also process the data received from the user operations on the picture. As discussed, the user operations can comprise one or more of selecting points on the picture and making a connection between selected points on the picture.

The example image data user authentication/authorization module 106 can authenticate the user and authorize the user for login to user device 102 based on data received at user device 102. The data received at user device 102 comprises data from user selections of a picture rendered on user device 102. As discussed in more detail later herein, the data can comprise locations of points on the picture selected by the user, depth of depressions made by the user on the picture, such as depressions made by one or more fingers of the user or a physical object such as a stylus and data regarding a connection between two points on the picture. The connection can comprise a straight line, a curved line or a combination of a straight and curved line.

The example network 108 is a computer network, such as the Internet. User device 102 can connect to or otherwise access server computer 110 via network 108.

The example server computer 110 is a server computer that can establish a login session with a user at user device 102 via network 108. For example, server computer 110 can be a server computer at a financial institution such as a bank. The user can have one or more financial accounts at the financial institution. When authenticated and authorized to log in to server computer 110, the user can access the one or more financial accounts from user device 102. Server computer 110 can also provide authentication pictures for download to user device 102. The pictures can be stored on server computer 110 or obtained from one or more other server computers or databases accessible from server computer 110.

Figure 2:
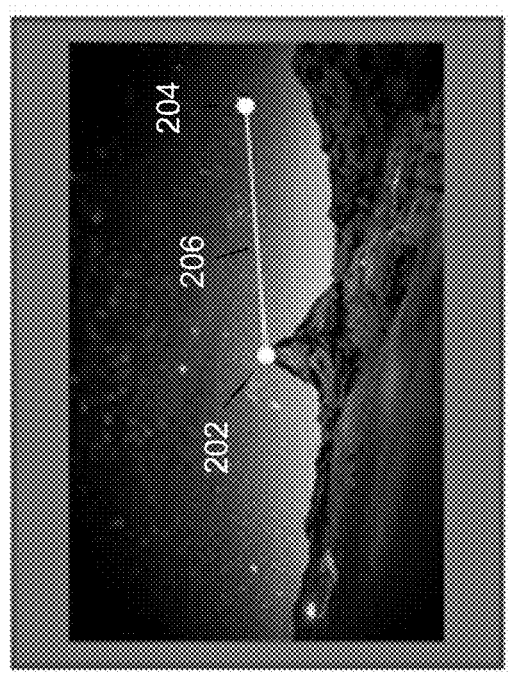
FIG. 2 shows example picture that can be displayed on the user device of FIG. 1.

FIG. 2 shows an image of an example picture 200 that can be displayed on user device 102 to authenticate the user. The picture 200 includes two example points, 202 and 204, that the user can pre-select and an example line 206 between the two points 202 and 204. In an example implementation, the user can pre-select picture 200 from one of a plurality of photos that can be stored on user device 102 or downloaded to user device 102. When picture 200 is displayed on user device 102 the user can then pre-select a plurality of points on picture 200 that can be used to authenticate the user during a login request. For example, one point can be example point 202 and another point can be point 204. As discussed later herein with respect to FIG. 3, each point is comprises an area that includes a plurality of pixels. More than two points can be selected. However, to ensure adequate authentication security, a minimum of two points on the picture need to be selected. For example, if only one point were selected, a fraudulent user may be able to guess where the one point would be located.

As an additional measure of authentication security, the user can draw a connection between the two points 202 and 204. As stated earlier herein, the connection can be a straight line between points 202 and 204, a curved line between points 202 and 204 or a combination of straight and curved lines between points 202 and 204. FIG. 2 shows an example straight line 206 connection between points 202 and 204.

When the example points 202 and 204 and the example line 206 are preselected, the image interface module 104 can also determine a depth of a depression on the display screen of user device 102 when the points 202 and 204 are selected and when the line 206 is drawn. The depression can be made by a finger of the user when selecting points 202 and 204 and when drawing line 206 or the depression can be made by a physical object, such as a stylus. The depth of depression for the points 202 and 204 and for the points on the line 206 can be determined, saved at user device 102 for reference during an authentication of the user. In addition, an angle made by the physical object on the display screen when the line is created can also be determined. Further, a shape of the depression made by the finger or physical object (for example a blunt or sharp depression) can be determined.

After the points on the picture are pre-selected and optionally, after a connection is made between the points and pre-selected, when the user attempts to log in to user device 102, the user can be prompted to re-select the previously selected points on the picture and to recreate the connection between the re-selected points. After the user attempts to re-select the points and recreate the connection, one or more of the location of the re-selected points, the shape of the recreated connection, the depth of the depressions made and the angle made by the finger or physical object can be saved.

The image data user authentication/authorization module 106 can then compare the re-selected data with pre-selected data and determine whether the user can be authenticated. For example, the image data user authentication/authorization module 106 can compare the locations of re-selected points 202 and 204 with the locations of pre-selected points 202 and 204 and determine whether a difference between coordinates for the locations is within a predetermined limit. For example, a difference of less than 10% can be used to authenticate the user and a difference of greater of equal to 10% can prevent authentication. In addition, a determination can be made as to whether a shape of the recreated connection matches a shape of the original connection. For example, points on the recreated connection can be compared with points on the original connection and a determination can be made as to whether a difference between the points on the connections is within a predetermined limit. Differences can also be calculated for depths of the depression for the points and for the connection and for the angle of the connection.

Each location that is selected can be identified via Cartesian coordinates, such as x-y coordinates on the picture. In addition, when force technology (3D touch technology) is used, the depth of a dimple made by a stylus or finger can be identified via a z coordinate. Further, a width of an impression on the display screen can be identified via a w coordinate. Each of the x, y, z and w coordinates comprises a number.

Although both points on the picture and a connection between the points can be used for authentication, in some implementations only points are used, in other implementations, only the connection is used and in yet other implementations a combination of the points and the connection can be used. A determination of which combination can be used can be made based on a degree of security needed for authentication and other information that may be known about the user.

Figure 3:
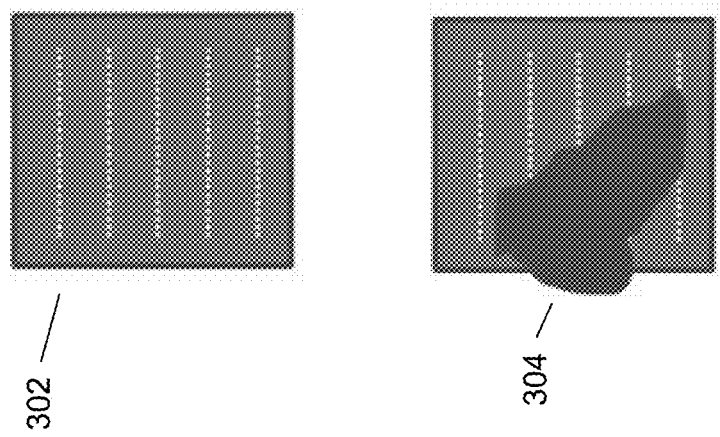
FIG. 3 shows an example pixel area of a pixel point.

FIG. 3 shows an example pixel area 302 of a pixel point on the picture. The example pixel area 302 comprises five rows of pixels, each row containing a number of pixels. The pixel area 302 is shown enlarged to display details of the pixel area 302. In an actual implementation, the pixel area 302 of the pixel point may a smaller number of rows and fewer pixels per row. In general, the size of the pixel area 302 can be based on an average width of a finger print so that a user can select the point on the picture with his/her finger. FIG. 3 also shows an example finger impression 304 on the pixel area 302. In an example implementation, the image interface module 104 can confirm a re-selection of a pre-selected point on the picture when any part of the finger impression 304 covers any part of the pixel area 302. In other example implementations, a specific percentage of the pixel area 302 may need to be covered by the finger impression 304 in order to confirm a re-selection of the pre-selected point on the picture. As an example, 25% of the pixel area 302 may need to be covered by the finger impression 304 in order to confirm the re-selection of the pre-selected point on the picture. Other percentages can be used.

Figure 4:
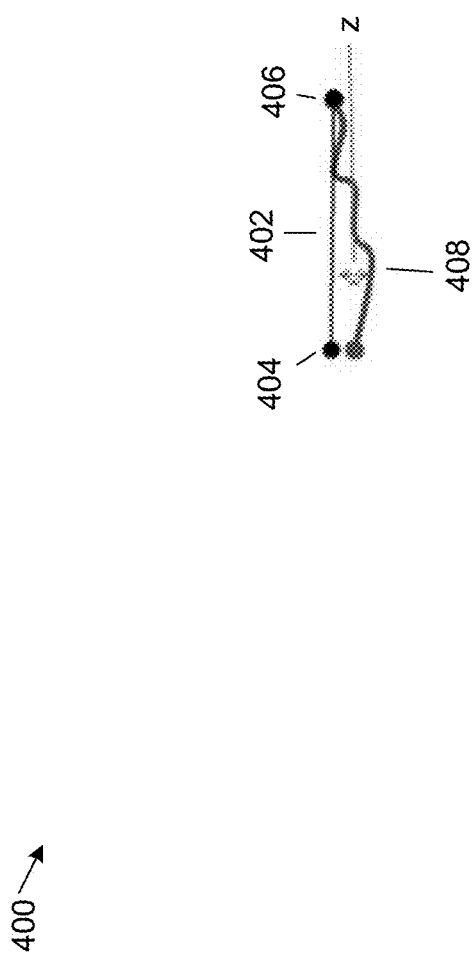
FIG. 4 shows example depth diagram of a connection.

FIG. 4 shows an example depth diagram 400 that shows how an example depth of a depression can vary as a connection is made on the picture. The example depth diagram comprises a line 402 between two example points 404 and 406 on the picture. The depth diagram 400 also shows an example depth line 408 below the line 402. The depth line 408 shows example depths of a depression on the display screen made by a finger or a physical object such as a stylus when the user traverses the display screen with the finger or physical object when making a connection from point 404 to point 406. At each point along the traverse, a distance between line 402 and depth line 408 corresponds to a depth of the depression, as represented by depth z. As shown, the depth z can vary from point to point along the traverse. When the user creates the line during a preselection phase of the authentication process, the image interface module 104 can record the depth of the depression at multiple points along the connection line. The image data user authentication/authorization module can compare the recorded depths with depths obtained when the user attempts to access user device 102 to determine whether the user can be authenticated.

In addition to implementing authentication according to the methods discussed earlier herein, another method can include physiological measurements, such as capturing and comparing heat generated a finger used to select an area on the display screen or make a connection between points and measuring a user's pulse. Yet another method can include measuring a contact force of a selection with a finger or physical object. The heat generated and contact forces can be saved and compared with heat generated by the finger and contact forces detected during a login attempt. Still other authentication methods are possible, for example the use of DNA identification.

Figure 5:
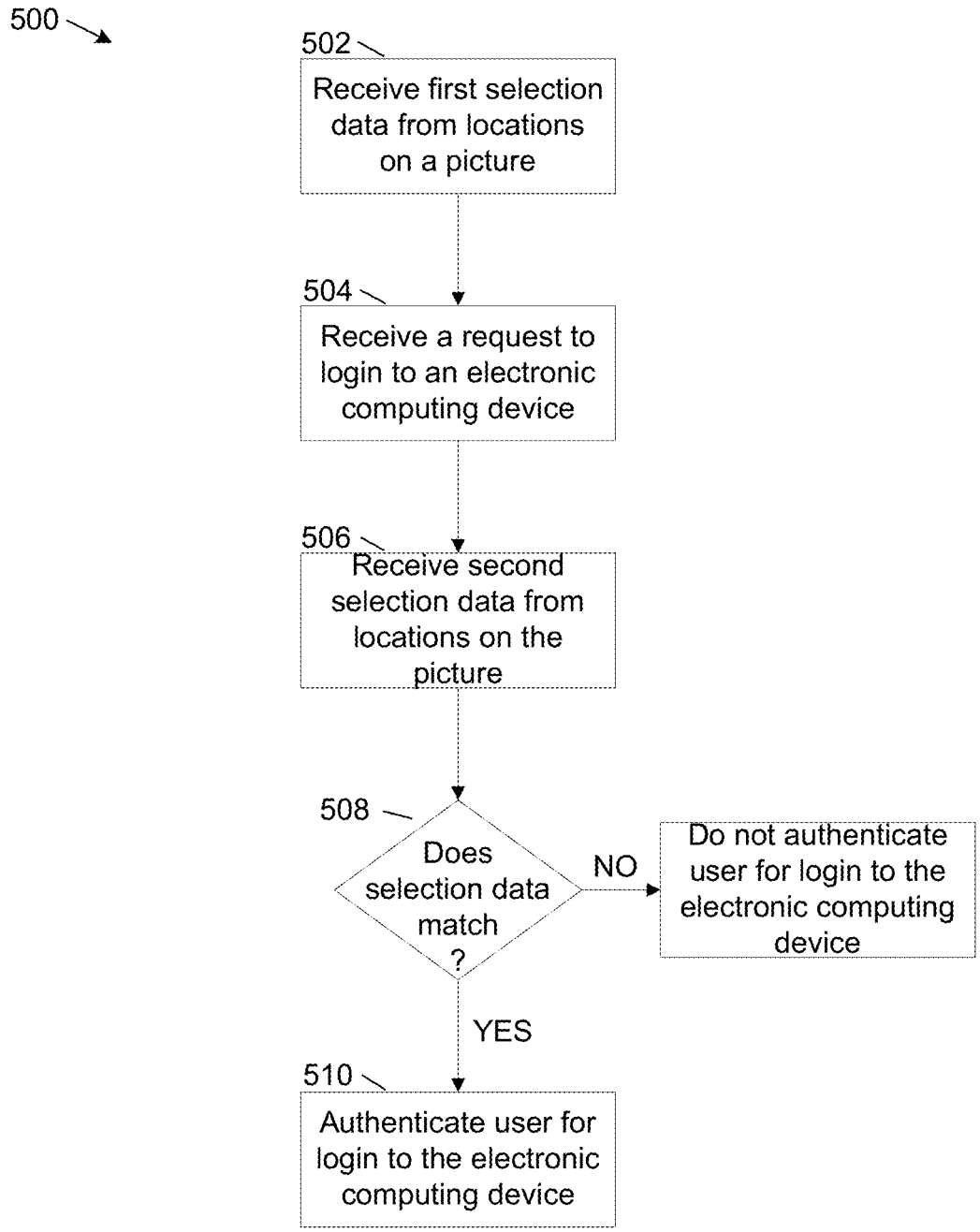
FIG. 5 shows a method for authenticating and authorizing a user at an electronic computing device without using a password.

FIG. 5 shows a flowchart of an example method 500 for authenticating and authorizing a user at an electronic computing device without using a password. The method 500 comprises comparing pixel point location selection data from a picture presented to the user on a user device, such as smart phone, during a request to login to the electronic computing device with preselected pixel point selection data.

At operation 502, a first selection of data from locations on the picture is received from the user device. The first selection corresponds to a pre-authentication process whereby the user selects locations that can be compared against additional selected locations during a login to the electronic computing device. For the implementation of method 500, the user preselects two locations on the picture. Each location corresponds to a small identifiable area on the picture, referred to in this disclosure as a point or a pixel point on the picture. Each selected location on the picture typically corresponds to an area on the picture that the user can remember during re-selection of each location when the user logs in to the electronic computing device. For example, each selected location could correspond to an identifiable area on the picture, such as a mountain top or a person's eye. The first selection of data, comprising locations for each selected point on the picture, is saved at the electronic computing device for use during a user login attempt at the electronic computing device.

At operation 504, a request is received from a user at the electronic computing device to log in to the electronic computing device.

At operation 506, a second selection of data from locations on the picture is received from the user device. When the user attempts to login to the electronic computing device, in lieu of entering a user ID and password, the user attempts to select the same locations on the picture that were selected during the pre-authentication process. The second selection of data can comprise the locations of the selected points of the picture, typically given in Cartesian coordinates. The second selection of data can also comprise an area of an imprint made on the user device by a selection device—either a finger of the user or a physical object. For example, the imprint can correspond to that shown in by finger impression 304 in FIG. 3. In addition, when the user device comprises a 3D touch screen, the second selection of data can also include a depth of a depression made by the user on the 3D touch screen when the second selection is made.

At operation 508, a determination is made as to whether aspects of the first selection data match aspects of the second selection data. As discussed above herein, the first selection data and the second selection data can comprise a plurality of aspects, such as location data for the selected points, a degree to which the selection device covers a pixel area of the selected points and a depth made by the selection device on the display screen of the user device. Other aspects are possible.

For method 500, the determination comprises how well locations from the second selection match locations from the first selection. The determination can be made by comparing coordinates of the second match locations with corresponding coordinates from the first match locations and determining whether a difference between the coordinates is within a predetermined threshold. For example, the threshold can be a percentage such as ten percent. When the difference in the coordinates is less than the threshold, the image data user authentication/authorization module 106 can determine that the user making the second selections is the same as the user who made the first selections during the pre-authorization process. The user can then be authenticated for login to the electronic computing device. Once the user is authenticated, the electronic computing device can authorize the user for operations on the electronic computing device corresponding to allowable operations for the user.

At operation 508, when a determination is made that locations from the first selection data match the selections from the second selection data, the user is authenticated to login to the electronic computing device.

At operation 508, when a determination is made that locations from the first selection data do not match the selections from the second selection data (i.e. a difference between the coordinate data for the first selections and the second selections is greater than the threshold), the user is not authenticated for login to the electronic computing device.

As discussed above, method 500 only uses a comparison of location data to determine whether to authenticate the user. However, as stated above, additional aspects of the first selection data and second selection data can be used, such as the depth of the depression made during the selection. In addition, in some implementations, especially those that may require a higher level of security, such as logging into an account at a financial institution, the user may be asked to perform additional authentication tasks, such as to make a connection between points on the picture.

Figure 6:
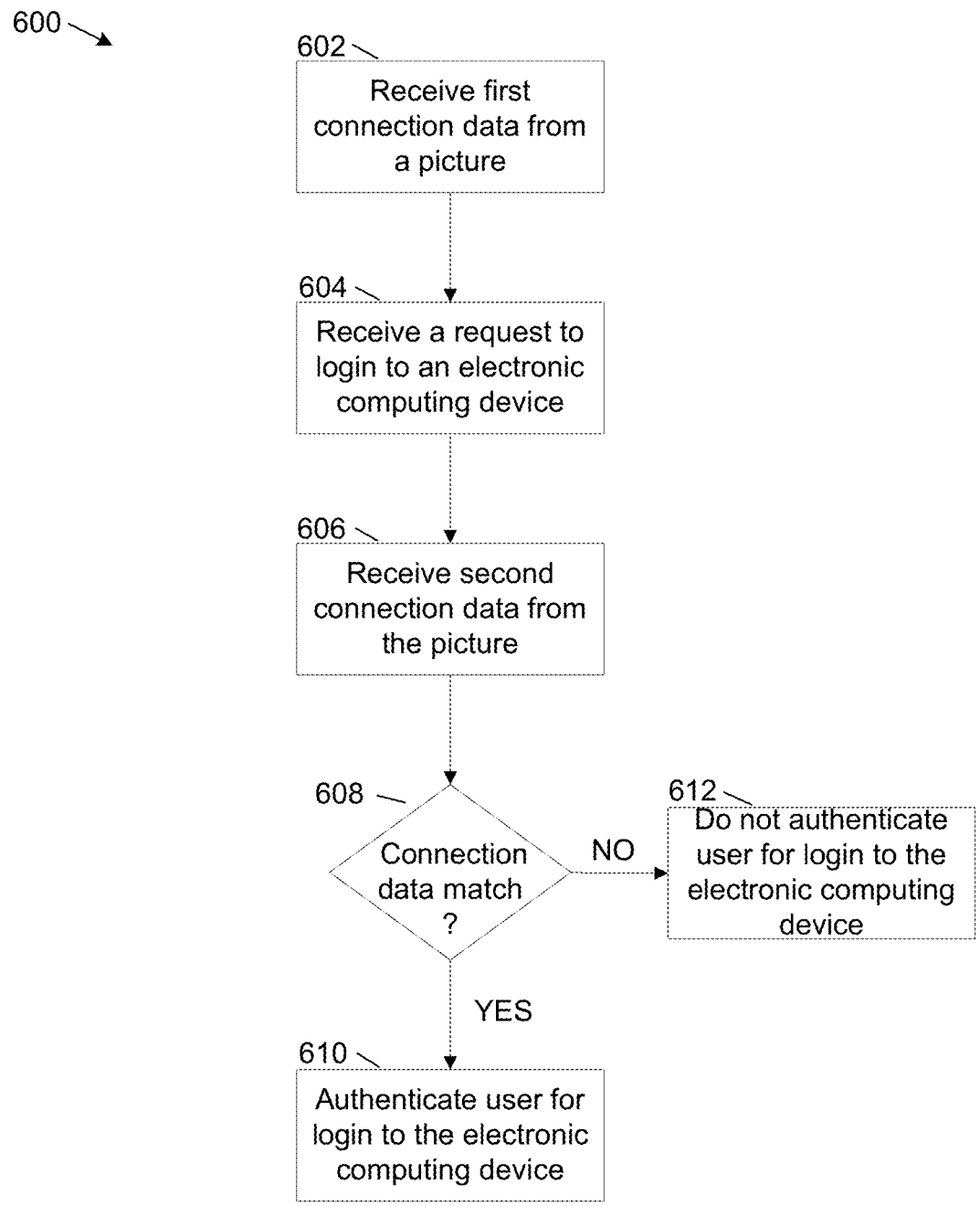
FIG. 6 shows another method for authenticating and authorizing a user at an electronic computing device without using a password.

FIG. 6 shows a flowchart of an example method 600 for an alternative method for authenticating and authorizing a user at an electronic computing device without using a password. In some implementations, method 600 may be used in addition to method 500 for a greater level of security. For the example method 600, the electronic computing device is user device 102.

At operation 602, first connection data from the user is received at user device 102. The first connection data comprises data from a first connection between two points on a picture displayed on user device 102. The first connection comprises a line between the two points. The line can be straight, curved, or a combination of straight and curved. The first connection data can comprise coordinates of points along the first connection, coordinates of starting and ending points on the connection, a depth of a depression made on a display screen on user device 102 for a plurality of coordinates along the first connection, a maximum depth of a depression along the first connection, an angle made by an object creating the first connection at various points along the first connection and other data. The object used to create the first connection can be the user's finger or a physical object, such as a stylus. The first connection data comprises is obtained as part of a pre-authentication login process for the user. The first connection data is saved by user device 102 and used as a baseline to compare with additional connection data when the user attempts to log in to the user device 102.

At operation 604, a request is received at user device 102 for the user to log in to user device 102. The user can initiate the request from a software application on user device 102. For example, the use can click on a login button on a display screen of user device 102.

At operation 606, second connection data is received at user device 102. The second connection data comprises data from a second connection between two points on the picture displayed on user device 102. In some implementations, the second selection of data is received in a same message that includes the login request. In other implementations, the second selection of data is received in a separate message.

The second connection is a result of a user attempt to duplicate the first connection made during the pre-authentication login process for the user. Thus, the user attempts to make the second connection between the same points used during the pre-authentication login process and having a same connection shape as the first connection made during the pre-authentication login process. The second connection data can comprise coordinates on the starting and ending points in the second connection, coordinates of various points along the connection, a depth of depression of the second connection for various points along the second connection, a maximum depth of depression of the second connection and an angle made by the physical object creating the second connection at various points along the second connection. In general, the second connection data is of the same type and consistent with the first connection data so that a comparison can be made.

At operation 608, a determination is made at user device 102 as to whether one or more aspects of the second connection data match the same one or more aspects of the first connection data. The aspects of the first connection data and the second connection data that can be compared include the coordinates of the starting and ending points on each connection, the depth of depressions made at the starting and ending points, the shape of each connection and the maximum depth of depressions made for each connection. For method 600, the aspects compared include comparisons of the starting and ending points of each connection and the shape of each connection. The comparisons of the starting and ending points can be made by subtracting coordinate values of the starting point from the ending point, obtaining a difference and determining whether the difference is within a predetermined threshold percentage, for example 10 percent. The comparisons of the shape of the connection can be made by taking samples of coordinate positions along the first connection and the second connection, obtaining a difference between the coordinates and determining whether the difference is between the predetermined threshold for a predetermined number of points along each connection, for example for 10 points along each connection. For the example implementation of method 600, when the comparisons of the starting and ending points on the connections and the comparisons of the predetermined points along the connections are all within the predetermined thresholds, a determination is made of a connection match.

At operation 608, when a determination is made that the connection data matches, at operation 610, the user is authenticated to log in to user device 102. However, when a determination is made at operation 608 that the connection data does not match, at operation 610, the user is not authenticated to log in to user device 102 and is prevented from logging in to user device 102.

Figure 7:
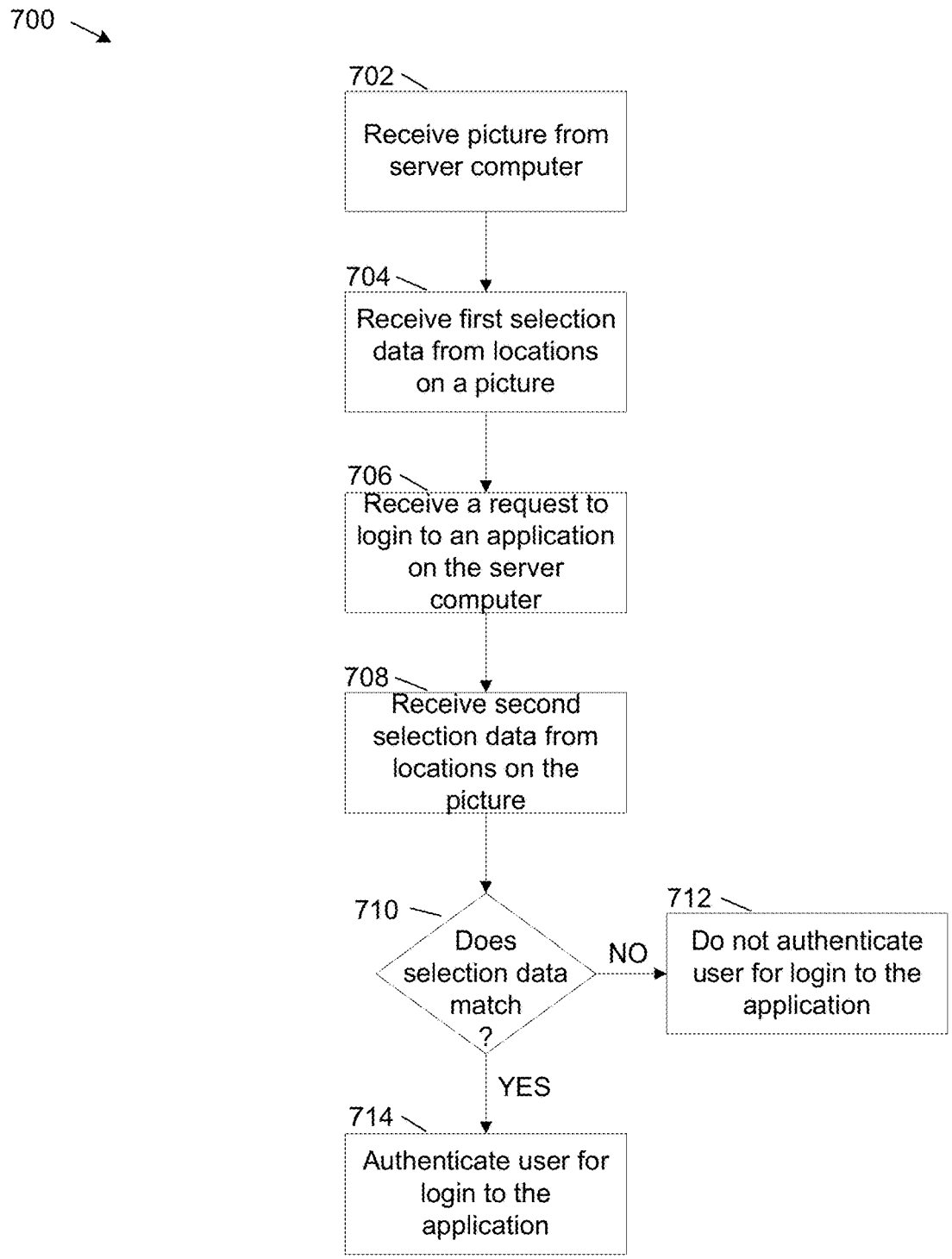
FIG. 7 shows a method for authenticating and authorizing a user to login to an application on the server computer of FIG. 1 without using a password.

FIG. 7 shows a flowchart of an example method 700 for authenticating and authorizing a user at an electronic computing device to login to an application at a server computer without using a password. The method 600 comprises comparing pixel point location selection data from a picture presented to the user on a user device, such as smart phone, during a request to login to the application. In an example implementation, the application can be an application for a financial institution such as a bank and the when the user is authenticated to login to the application, the user is able to access financial account information for the user.

At operation 702, a picture is received from the server computer. For example, the picture can be received when a user interface for the application is displayed on the user device when the user attempts to login to the application.

At operation 704, a first selection of data from locations on the picture is received from the user device. The first selection corresponds to a pre-authentication process whereby the user selects locations that can be compared against additional selected locations during a login to the application. For the implementation of method 500, the user preselects two locations on the picture. Each location corresponds to a small identifiable area on the picture, referred to in this disclosure as a point or a pixel point on the picture. Each selected location on the picture typically corresponds to an area on the picture that the user can remember during re-selection of each location when the user logs in to the application. For example, each selected location could correspond to an identifiable area on the picture, such as a mountain top or a person's eye. The first selection of data, comprising locations for each selected point on the picture, is saved at the electronic computing device for use during a user login attempt at the electronic computing device.

At operation 706, a request is received from a user at the user device to log in to the application.

At operation 708, a second selection of data from locations on the picture is received from the user device. When the user attempts to login to the application, in lieu of entering a user ID and password, the user attempts to select the same locations on the picture that were selected during the pre-authentication process. The second selection of data can comprise the locations of the selected points of the picture, typically given in Cartesian coordinates. The second selection of data can also comprise an area of an imprint made on the user device by a selection device—either a finger of the user or a physical object. For example, the imprint can correspond to that shown in by finger impression 304 in FIG. 3. In addition, when the user device comprises a 3D touch screen, the second selection of data can also include a depth of a depression made by the user on the 3D touch screen when the second selection is made.

At operation 710, a determination is made as to whether aspects of the first selection data match aspects of the second selection data. As discussed above herein, the first selection data and the second selection data can comprise a plurality of aspects, such as location data for the selected points, a degree to which the selection device covers a pixel area of the selected points and a depth made by the selection device on the display screen of the user device. Other aspects are possible.

For method 700, the determination comprises how well locations from the second selection correspond to locations from the first selection. The determination can be made by comparing coordinates of the second match locations with corresponding coordinates from the first match locations and determining whether a difference between the coordinates is within a predetermined threshold. For example, the threshold can be a percentage such as ten percent. When the difference in the coordinates is less than the threshold, the image data user authentication/authorization module 106 can determine that the user making the second selections is the same as the user who made the first selections during the pre-authorization process. The user can then be authenticated for login to the application. Once the user is authenticated, the application can authorize the user for operations on the server computer corresponding to allowable operations for the user.

At operation 710, when a determination is made that locations from the first selection data match the selections from the second selection data, the user is authenticated to login to the application.

At operation 710, when a determination is made that locations from the first selection data do not match the selections from the second selection data (i.e. a difference between the coordinate data for the first selections and the second selections is greater than the threshold), the user is not authenticated for login to the application.

As discussed above, method 700 only uses a comparison of location data to determine whether to authenticate the user. However, as stated above, additional aspects of the first selection data and second selection data can be used, such as the depth of the depression made during the selection. In addition, in some implementations, especially those that may require a higher level of security, such as logging into an account at a financial institution, the user may be asked to perform additional authentication tasks, such as to make a connection between points on the picture.

Figure 8:
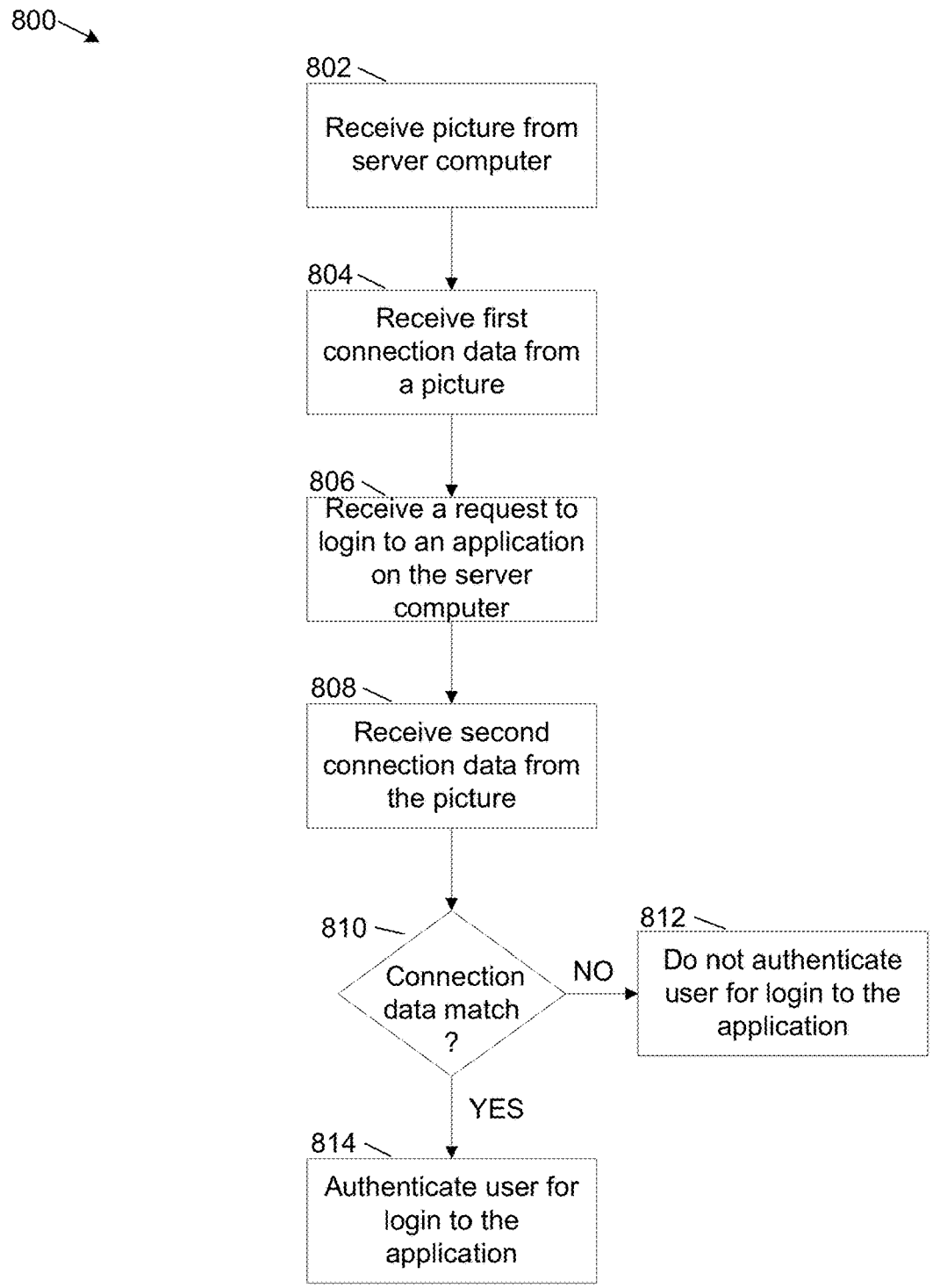
FIG. 8 shows another method for authenticating and authorizing a user to login to an application on the server computer of FIG. 1 without using a password.

FIG. 8 shows a flowchart of an example method 800 for an alternative method for authenticating and authorizing a user at an electronic computing device to login to an application on a server computer without using a password. In some implementations, method 800 may be used in addition to method 700 for a greater level of security. For the example method 600, the electronic computing device is user device 102 and the server computer is server computer 110.

At operation 802, a picture is received from the server computer. For example, the picture can be received when a user interface for the application is displayed on the user device when the user attempts to login to the application.

At operation 804, first connection data from the user is received at user device 102. The first connection data comprises data from a first connection between two points on a picture displayed on user device 102. The first connection comprises a line between the two points. The line can be straight, curved, or a combination of straight and curved. The first connection data can comprise coordinates of points along the first connection, coordinates of starting and ending points on the connection, a depth of a depression made on a display screen on user device 102 for a plurality of coordinates along the first connection, a maximum depth of a depression along the first connection, an angle made by an object creating the first connection at various points along the first connection and other data. The object used to create the first connection can be the user's finger or a physical object, such as a stylus. The first connection data comprises is obtained as part of a pre-authentication login process for the user. The first connection data is saved by user device 102 and used as a baseline to compare with additional connection data when the user attempts to log in to the application.

At operation 806, a request is received at user device 102 for the user to log in to the application. The user can initiate the request from a software application on user device 102. For example, the use can click on a login button on a display screen of user device 102.

At operation 808, second connection data is received at user device 102. The second connection data comprises data from a second connection between two points on the picture displayed on user device 102.

The second connection is a result of a user attempt to duplicate the first connection made during the pre-authentication login process for the user. Thus, the user attempts to make the second connection between the same points used during the pre-authentication login process and having a same connection shape as the first connection made during the pre-authentication login process. The second connection data can comprise coordinates on the starting and ending points in the second connection, coordinates of various points along the connection, a depth of depression of the second connection for various points along the second connection, a maximum depth of depression of the second connection and an angle made by the physical object creating the second connection at various points along the second connection. In general, the second connection data is of the same type and consistent with the first connection data so that a comparison can be made.

At operation 810, a determination is made at user device 102 as to whether one or more aspects of the second connection data match the same one or more aspects of the first connection data. The aspects of the first connection data and the second connection data that can be compared include the coordinates of the starting and ending points on each connection, the depth of depressions made at the starting and ending points, the shape of each connection and the maximum depth of depressions made for each connection. For method 800, the aspects compared include comparisons of the starting and ending points of each connection and the shape of each connection. The comparisons of the starting and ending points can be made by subtracting coordinate values of the starting point from the ending point, obtaining a difference and determining whether the difference is within a predetermined threshold percentage, for example 10 percent. The comparisons of the shape of the connection can be made by taking samples of coordinate positions along the first connection and the second connection, obtaining a difference between the coordinates and determining whether the difference is between the predetermined threshold for a predetermined number of points along each connection, for example for 10 points along each connection. For the example implementation of method 800, when the comparisons of the starting and ending points on the connections and the comparisons of the predetermined points along the connections are all within the predetermined thresholds, a determination is made of a connection match.

At operation 810, when a determination is made that the connection data matches, at operation 812, the user is authenticated to log in to the application. However, when a determination is made at operation 810 that the connection data does not match, at operation 814, the user is not authenticated to log in to the application and is prevented from logging in to the application.

Figure 9:
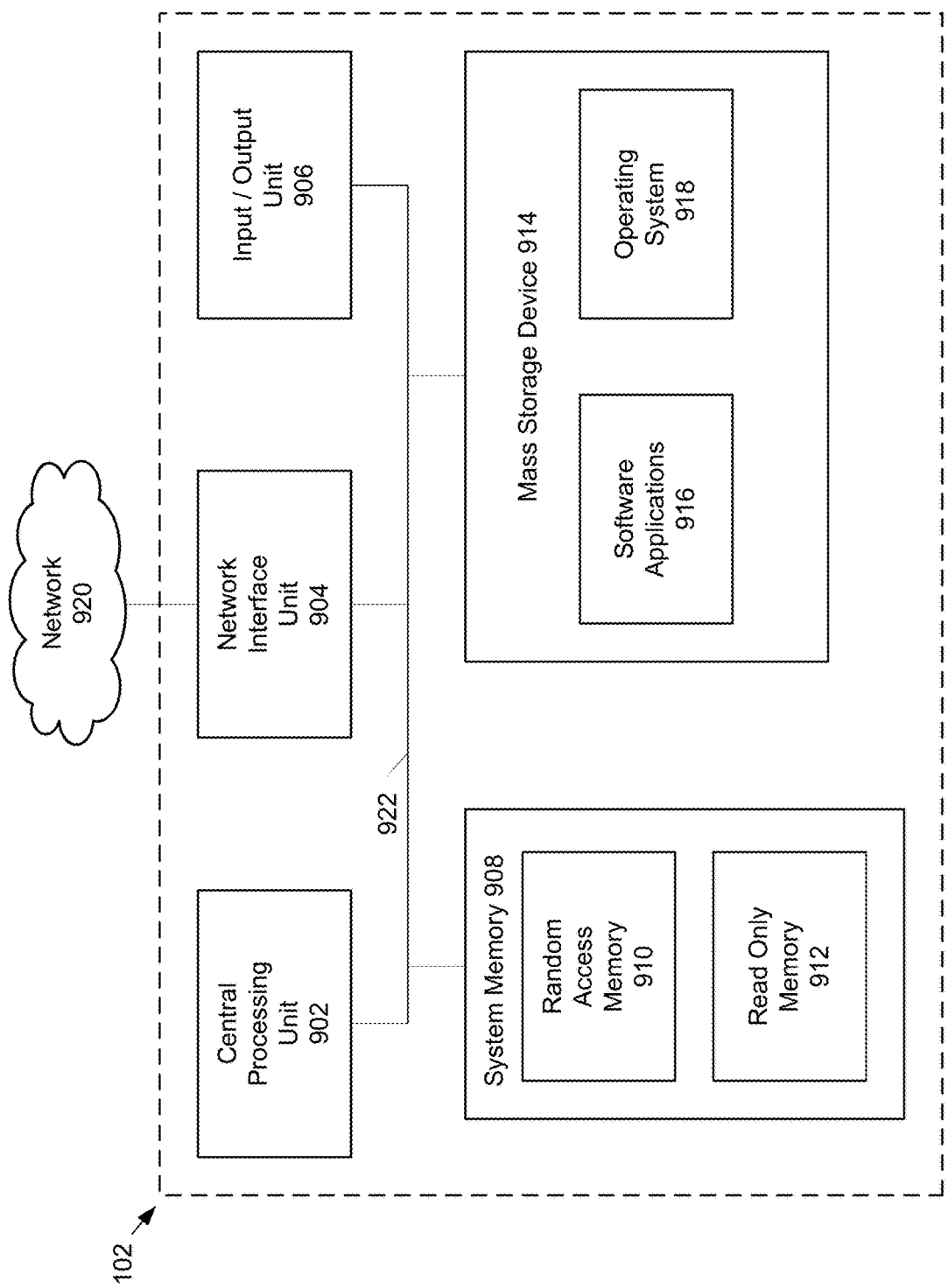
FIG. 9 shows example physical components of the user devices of the system of FIG. 1.

As illustrated in the example of FIG. 9, user device 102 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the user device 102, such as during startup, is stored in the ROM 912. The user device 102 further includes a mass storage device 914. The mass storage device 914 is able to store software instructions and data. Some or all of the components of the user device 102 can also be included in server computer 110.

The mass storage device 914 is connected to the CPU 902 through a mass storage controller (not shown) connected to the system bus 922. The mass storage device 914 and its associated computer-readable data storage media provide non-volatile, non-transitory storage for the user device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the user device 102.

According to various embodiments of the invention, the user device 102 may operate in a networked environment using logical connections to remote network devices through the network 920, such as a wireless network, the Internet, or another type of network. The user device 102 may connect to the network 920 through a network interface unit 904 connected to the system bus 922. It should be appreciated that the network interface unit 904 may also be utilized to connect to other types of networks and remote computing systems. The user device 102 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the user device 102 can store software instructions and data. The software instructions include an operating system 918 suitable for controlling the operation of the user device 102. The mass storage device 914 and/or the RAM 910 also store software instructions, that when executed by the CPU 902, cause the user device 102 to provide the functionality of the user device 102 discussed in this document. For example, the mass storage device 914 and/or the RAM 910 can store software instructions that, when executed by the CPU 902, cause the user device 102 to display received data on the display screen of the user device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for authenticating a user on the electronic computing device, the method comprising:
    receiving a request to authenticate the user;
    receiving first data from the electronic computing device, the first data comprising first selections of the user of a plurality of locations from a picture displayed on a display screen of the electronic computing device, the first data representing (a) a first connection with a first line drawn by the user between two selected locations on the picture, wherein the first connection includes a pixel area of a starting point on a first location of the two selected locations and an ending point on a second location of the two selected locations, and (b) first force data representing first forces applied by the user when making the first connection, wherein the first force data includes a maximum depth of a first depression and a width of the first connection between the two selected locations of the picture;
    comparing the first data with second data, wherein the second data includes at least a second connection with a second line drawn by the user between said two selected locations on the picture in accordance with a pre-authentication process;
    determining whether the first data corresponds to the second data based on (a) each of the starting point and ending point for the first connection being within a first threshold percentage from each corresponding starting and ending point in the second data, and (b) the maximum depth of the first depression and the width of the first connection for the first data being within a second threshold percentage and a third threshold percentage, respectively, of a maximum depth of a second depression and a width of the second connection for the second data; and
    when coordinates of the selected locations, the maximum depths of the depressions and the widths of the connections on the displayed picture are within predetermined limits of the first, the second and the third threshold percentages, successfully authenticating the user for login to the electronic computing device.

2. The method of claim 1, wherein determining whether the first data corresponds to the second data comprises determining whether the first location from the first data matches the second location from the second data and determining whether a third location from the first data matches a fourth location from the second data.

3. The method of claim 2, wherein the first location and the second location correspond to a first pixel area of the picture and wherein the third location and the fourth location corresponds to a second pixel area of the picture.

4. The method of claim 3, wherein the first location, the second location, the third location and the fourth location are determined from Cartesian coordinates on the picture.

5. The method of claim 1, wherein the first force data includes a first depth of the first depression on one of the plurality of locations of the picture corresponding to one of the first selections and second force data includes a second depth of a second depression on the plurality of locations of the picture corresponding to one of the second selections.

6. The method of claim 5, wherein determining whether the first data corresponds to the second data further comprises determining whether a difference between the first depth and the second depth is within a predetermined limit.

7. The method of claim 5, wherein the first depression is made by a finger of the user.

8. The method of claim 5, wherein the first depression is made by a physical object.

9. The method of claim 1, wherein the second data comprises data entered into the electronic computing device during a preliminary authentication procedure, the second data comprising second selections of the user of a plurality of locations from a picture displayed on the electronic computing device, the second data also comprising second force data representing second forces applied by the user when making the second selections.

10. The method of claim 1, further comprising:
before receiving the request to authenticate the user, receiving third data from the electronic computing device, the third data being associated with a first connection between two of the plurality of locations on the picture; and
after receiving the request to authenticate the user, receiving fourth data from the electronic computing device, the fourth data being associated with a second connection between the two of the plurality of locations on the picture.

11. The method of claim 10, wherein determining whether the first data corresponds to the second data comprises determining whether a shape for the first connection matches the shape for the second connection.

12. The method of claim 11, wherein determining whether the first data corresponds to of the second data further comprises determining whether a difference between the first maximum depth of the first depression and the second maximum depth of the second depression is within a first predetermined limit.

13. The method of claim 12, wherein the third data includes information regarding a first angle made by the first depression on the picture for the first connection and the fourth data includes information regarding a second angle made by the second depression on the picture for the second connection.

14. The method of claim 13, wherein determining whether the first data corresponds to of the second data further comprises determining whether a difference between the first angle made by the first depression and the second angle made by the second depression is within a second predetermined limit.

15. The method of claim 10, wherein the third data includes information regarding a first maximum depth of a first depression made on the picture for the first connection and the fourth data includes information regarding a second maximum depth of a second depression made on the picture for the second connection.

16. A method implemented on an electronic computing device for authenticating a user on the electronic computing device, the method comprising:
displaying a picture on a display screen of the electronic computing device that can be used to authenticate the user;
receiving first data for a first connection between a plurality of selected locations on the picture, the first connection including a first line drawn between the plurality of selected locations on the picture, wherein the first data is collected in accordance with a pre-authentication process and wherein (a) the first connection comprises a connection between a first pixel area of a starting point for a first location of the selected locations and a second pixel area of an ending point for a second location of the selected locations and (b) first force data represents a first force applied by the user making the first connection, wherein the first force data includes a maximum depth of a first depression and a width of the first connection;
receiving a request to authenticate the user;
receiving second data for a second connection between the plurality of selected locations on the picture, the second connection including a second line drawn between the plurality of selected locations on the picture;
comparing the first data with the second data;
determining whether first aspects of the first data corresponds to the second data based on (a) each of the starting point and ending point for the first connection for the first data being within a first threshold percentage from a corresponding starting and ending point for the second connection for the second data and (b) the maximum depth of the first depression and the width of the first connection for the first data being within a second threshold percentage and a third threshold percentage, respectively, of a maximum depth of a second depression and a width of the second connection for the second data; and
when coordinates of the selected locations, the maximum depths of the depressions and the widths of the connections on the displayed picture are within predetermined limits of the first, the second and the third threshold percentages, respectively, successfully authenticating the user for login to the electronic computing device.

17. The method of claim 16, wherein determining whether the first data corresponds to the second data comprises determining whether a first shape of the first connection matches a second shape of the second connection.

18. The method of claim 16, wherein determining whether the first data corresponds to of the second data comprises determining whether a first maximum depth of first depressions made on a display screen of the electronic computing device for the first line is within a predetermined threshold of a second maximum depth of second depressions made on the display screen for the second line.

19. The method of claim 16, wherein determining whether the first data corresponds to the second data comprises determining whether a first width of the first line is within a predetermined threshold of a second width of the second line.

20. A electronic computing device for authenticating a user on the electronic computing device, comprising:
a hardware processing unit; and
system memory, the system memory including instructions which, when executed by the hardware processing unit, cause the electronic computing device to:
render a picture on a display screen of the electronic computing device;
receive first data from a first connection made by a user between two locations on the picture, the first connection comprising a first line drawn by the user connecting a first of the two locations with a second of the two locations, the first data comprising part of an authentication procedure for the user on the electronic computing device wherein the first connection is made by the user between the two locations on the picture in accordance with a pre-authentication process and wherein the first connection comprises a connection between a first pixel area of a starting point for a first location of the two locations and a second pixel area of an ending point for a second location of the two locations;

receive a request to authenticate the user;

receive second data from a second connection made by the user between the two locations on the picture, the second connection comprising a second line drawn by the user connecting the first of the two locations with the second of the two locations;

determine whether a first connection point from the first data is within a first threshold percentage from a second connection point from the second data and determine whether a third connection point from the first data is within the first threshold percentage from a fourth connection point from the second data, wherein the first connection point corresponds to a first starting point for the first connection, the second connection point corresponds to a second starting point for the second connection, the third connection point corresponds to a first ending point for the first connection and the fourth connection point corresponds to a second ending point for the second connection; and when a determination is made that the first connection point from the first data is within the first threshold percentage from the second connection point from the second data and when a determination is made that the third connection point from the first data is within the first threshold percentage from the fourth connection point from the second data:

determine whether a first maximum depth of first depressions made on the display screen of the electronic computing device for the first line is within a second threshold percentage of a second maximum depth of second depressions made on the display screen for the second line;

determine whether a first width of the first line is within a third threshold percentage of a second width of the second line; and when the first maximum depth of the first depressions for the first line is within the second threshold percentage of the second maximum depth of the second depressions for the second line and when the first width of the first line is within the third threshold percentage of the second width of the second line, authenticate the user to log in to the electronic computing device.

* * * * *

UNITED STATES PATENT AND TRADEMARK OFFICE
CERTIFICATE OF CORRECTION

PATENT NO. : 10,027,657 B1
APPLICATION NO. : 15/203480
DATED : July 17, 2018
INVENTOR(S) : Vempati et al.

Page 1 of 1

It is certified that error appears in the above-identified patent and that said Letters Patent is hereby corrected as shown below:

In the Claims

Column 15, Line 36, Claim 12, Line 2 of claim: "to of" should read --to--

Column 15, Line 48, Claim 14, Line 2 of claim: "to of" should read --to--

Column 16, Line 19, Claim 16, Line 18 of claim: "first aspects of" should be deleted Column 16, Line 43, Claim 18, Line 2 of claim: "to of" should read --to--

Signed and Sealed this
Twenty-sixth Day of February, 2019

Andrei Iancu
*Director of the United States Patent and Trademark Office*